Feb. 23, 1943. W. C. GARDINER ET AL 2,311,745
MERCURY AMALGAM DECOMPOSITION CELL
Filed Aug. 19, 1939
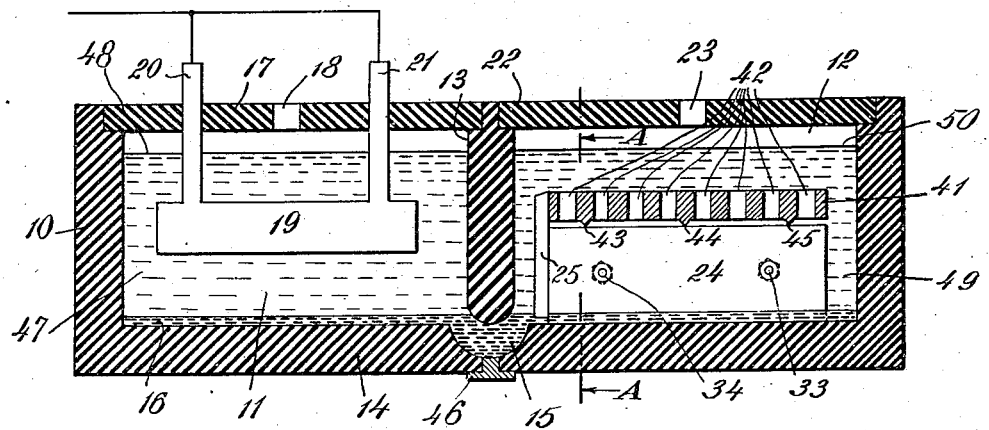
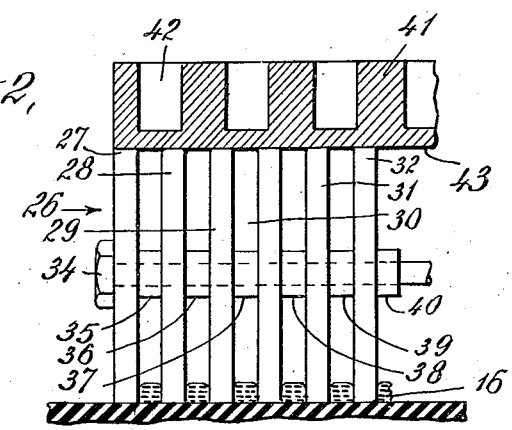
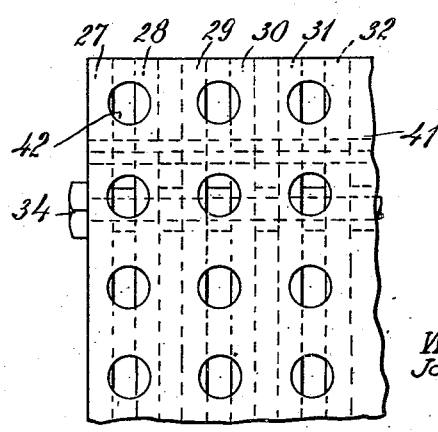
William C. Gardiner
Joseph Leonard Wood
INVENTORS
BY
Pennie, Davis, Marvin and Edmonds
ATTORNEYS Patented Feb. 23, 1943

2,311,745

UNITED STATES PATENT OFFICE 2,311,745

MERCURY AMALGAM DECOMPOSITION CELL

William C. Gardiner and Joseph Leonard Wood, Niagara Falls, N. Y., assignors to The Mathieson Alkali Works, Inc., New York, N. Y., a corporation of Virginia Application August 19, 1939, Serial No. 291,001

2 Claims. (Cl. 204—221)

This invention is concerned with operations in which an alkali metal is released from an amalgam in the presence of water with resultant formation of hydrogen and a hydroxide of the metal, and particularly with the release of sodium from an amalgam in the cathode or decomposition compartment of a so-called mercury cell, for example cells of the stationary or rocking type. The invention aims to facilitate the production of alkali metal hydroxide solutions in such cells and the release of hydrogen therefrom without increasing the energy introduced into the cell as heat or electricity.

Mercury cells usually comprise a pair of compartments having walls of insulating material. An anode is disposed in an anode or amalgam-forming compartment to which is supplied an aqueous solution of an alkali metal salt, for example, sodium chloride. When this salt is employed, a layer of mercury in the amalgam-forming compartment acts as cathode and takes up sodium resulting from the electrolysis of the solution, chlorine being released at the anode. The sodium amalgam thus formed is pumped or flowed into the decomposition compartment containing a cathode, where the sodium is released from the amalgam and reacts with an aqueous body in the cell to form hydrogen and sodium hydroxide. The mercury then is returned to the amalgam-forming compartment and continues to be circulated from one compartment to another carrying sodium to the decomposition compartment.

The reaction of sodium or other alkali metal from the amalgam with the water in the decomposition compartment to form gaseous hydrogen and alkali metal hydroxide solution is facilitated by discharging the hydrogen from the surface of an electrical conductor that is electrically connected to the amalgam. This, in effect, produces a short-circuited electrolytic cell in which the amalgam is anode, the electrically conducting material is cathode and the aqueous solution of alkali metal hydroxide is the electrolyte. The tendency of the alkali metal to leave the amalgam and react with the water supplies potential to drive current through the short-circuited cell and bring about a discharge of hydrogen. In other words, the alkali metal solution potential is opposite to and must overcome the hydrogen discharge potential and the potential drop through the hydroxide solution. The greater the hydrogen discharge potential or the greater the potential drop through the hydroxide solution, the greater must be the potential resulting from the tendency of the alkali metal to be released from the amalgam. This solution potential of the alkali metal increases as the concentration of the metal in the amalgam increases, so that in a sense, hydrogen discharge is facilitated by allowing the concentration of the alkali metal in the amalgam to build up. This, however, affords no practical solution to the problem of facilitating hydrogen discharge, because the power efficiency of a cell decreases as the concentration of alkali metal increases in the amalgam. In short, in order to facilitate hydrogen discharge without loss of power efficiency the hydrogen discharge potential and the potential drop through the solution should be kept at a minimum.

The hydrogen discharge potential comprises two components, viz.:

(1) The equilibrium discharge potential, which depends upon the concentration of alkali metal hydroxide in the solution and the temperature of the solution; and (2) The hydrogen overvoltage which depends upon cell temperature, current density and the nature of the material from which the hydrogen is discharged. Generally speaking, and with reference to a given material from which the hydrogen is discharged, hydrogen overvoltage decreases as the cell temperature is increased and as the current density is decreased. It is desirable, however, to operate with minimum cell temperatures and with relatively high current densities, so the material from which the hydrogen is discharged, for example the cathode in the cathode compartment, should be such as to afford low hydrogen overvoltage.

Mercury is not such a material and has a hydrogen overvoltage of 1.07 or more volts as compared with 0.98 volt for graphite, 0.82 volt for iron, and lower figures for other metals ranging down to 0.04 volt for platinum. Iron cathodes afford desirable discharge surfaces for hydrogen in mercury cells, and have been employed heretofore. However, they tend to amalgamate slowly with mercury and in cells of heretofore customary construction eventually become coated with mercury and hence have the high overvoltage of this latter metal.

As a result of our investigations, however, we have discovered improvements in cell structure whereby the low hydrogen overvoltage of iron and other metals is made available for a relatively long period of time to facilitate hydrogen discharge in mercury cells and the like in which alkali metal from an alkali metal amalgam is reacted with water. Thus, in an operation in which an amalgam of mercury with sodium or potassium is moved into contact with an overlying aqueous body and the sodium or potassium reacted with the water of the body to form hydrogen and sodium or potassium hydroxide solution, our invention contemplates a cathode of a substantially non-amalgamating material such as graphite, carbon or ferrosilicon disposed in contact with the amalgam and projecting upwardly into the aqueous body to a point beyond which the amalgam normally is carried by splashing or otherwise, and a member of a metal having a lower overvoltage with respect to hydrogen than does graphite in contact with the graphite cathode and entirely disposed above said point but in contact with the aqueous body. The member thus affords a discharge surface of low hydrogen overvoltage in a short-circuited electrolytic cell in which the graphite cathode, which does not amalgamate with the mercury, is in contact with the amalgam which acts as anode, and the aqueous body in which the sodium or potassium hydroxide is formed is in contact with both the graphite cathode and the anode. However, the mercury, in its movement, does not come in substantial contact with the discharge member, which remains clean for a relatively long period and so affords a permanent surface of low hydrogen discharge potential.

The height of the discharge member above the normal level of amalgam in the compartment in which the reaction of the alkali metal of the amalgam is reacted with the water will depend to some degree upon the violence with which the amalgam is introduced and the consequent turbulence of the mass of amalgam in the compartment. We have discovered, however, that turbulence can be reduced substantially (and the necessary height of the discharge member above the normal upper surface of the amalgam consequently diminished) by so disposing the graphite cathode that it affords slight resistance to the introduction of the amalgam and does not act as a dam. In other words, the major surface of the graphite cathode should be substantially parallel to the direction of introduction of the amalgam. Moreover, tendency of the amalgam to splash or otherwise be disseminated into the overlying body of alkali hydroxide solution is minimized if the graphitic cathode is a grid offering a plurality of passages for the amalgam substantially parallel to the direction of introduction of the mercury. A preferred form of cathode construction in accordance with our invention is a series of upright graphite plates spaced from each other and disposed with their major surfaces in the direction of amalgam introduction and in contact with the amalgam. The metallic discharge member rests on top of these plates in good electrical contact herewith (and hence with the amalgam) and the upwardly extending plate surfaces appear to act as baffles which reduce the tendency of the amalgam to splash and also tend to collect any disseminated amalgam in the aqueous body and prevent it from reaching the discharge member.

These and other features of our invention will be more thoroughly understood in the light of the following detailed description, taken in conjunction with the accompanying drawings in which Fig. 1 is an elevation, partly in section, of a mercury cell of the Castner type taken through its amalgam-forming and decomposition compartments along the line of amalgam passage and equipped with a graphite cathode and a special hydrogen discharge member in accordance with our invention.

Fig. 2 is a fragmentary vertical section taken through the graphite cathode and the discharge member of Fig. 1 at right angles to the view shown therein along the line A—A, and Fig. 3 is a fragmentary plan of the graphite cathode and the overlying discharge member of Figs. 1 and 2.

Referring now to Fig. 1, the apparatus comprises a cell 10 of insulating material having an amalgam-forming compartment 11 and a decomposition compartment 12 divided by a vertical partition 13. In the bottom 14 of the cell, immediately below the partition there is a slot 15 through which a layer 16 of mercury or sodium amalgam may flow from compartment to compartment as the cell is rocked by conventional means (not shown). The amalgam-forming compartment is sealed with a cover 17 of insulating material provided with a chlorine outlet 18. An anode 19 of carbon or the like is suspended in the amalgam-forming compartment by a pair of integrally formed rods 20, 21 that extend through the cover. Similarly, the decomposition compartment is sealed by a cover 22 of insulating material provided with a hydrogen outlet 23 and with a cathode 24.

For details of construction of the cathode and of an overlying discharge member 26, reference should be made to all three figures, in which it appears that the cathode comprises a plurality of rectangular graphite plates 27, 28, 29, 30, 31, 32, set upright with their long edges resting on the bottom of the cell in contact with the amalgam layer and substantially parallel to the direction of introduction of amalgam into the decomposition compartment, i. e., at right angles to the partition between the compartments. The graphite plates are held together with tie rods 33, 34 which lie substantially horizontal and pass through holes in the respective plates and through a series of small annular spacers 35, 36, 37, 38, 39, 40, disposed between plates to hold them apart in fixed relationship to each other. The tie rods may be of iron or steel and provided with nuts at the ends thereof, and the spacers may be washers of graphite or a metal, such as iron, which is not consumed rapidly by amalgamation.

As indicated hereinbefore, the cathode plates may be made of any relatively good conductive solid that is not wet appreciably by sodium amalgam and has a hydrogen overvoltage higher than has iron (or other metal from which the discharge member is made). Among such materials are carbon and ferrosilicon, but graphite is preferred.

Resting on top of the graphite plates which compose the cathode is a massive iron discharge member 41, having vertical perforations 42 therein and provided on its underside with raised projections or knife edges 43, 44, 45 which rest crosswise on the graphite plates and establish good electrical contact therewith.

An auxiliary contact member 25, such as an iron bar, projects from the discharge member 41 into the mercury and is in contact with the graphite cathode, so that the latter is short-circuited, partly through the mercury-graphite contact and partly through the auxiliary contact member.

In the bottom of the slot between compartments there is an electrical contact member 46 which is in contact with the mercury contained in the slot and projects from the bottom to be connected to the D. C. cell circuit in the conventional manner.

A concentrated solution of sodium chloride is supplied to and maintained in the amalgam-forming compartment to form a pool 47 having a level 48 above the anode, while in the decomposition compartment there is a pool 49 of a conductive aqueous solution (say, of sodium hydroxide) maintained at a level 50 above the top of the iron discharge member.

In the operation of the cell, as in heretofore customary operations, current is passed through the sodium chloride solution in the amalgam-forming compartment. Chlorine is discharged at the anode, and is withdrawn from the compartment. Sodium collects in the mercury layer, which acts as cathode in this compartment, and the resulting sodium amalgam is carried over into the decomposition compartment as the cell is rocked, or by pumping. In the decomposition compartment the sodium of the amalgam combines with hydroxyl ions from the water to form sodium hydroxide, the hydrogen resulting from the decomposition of the water being discharged as a gas from the iron discharge member and from the graphite plates and drawn off through the hydrogen outlet.

Rocking or pumping returns the depleted amalgam to the amalgam-forming compartment where it acquires a fresh supply of sodium for transfer to the decomposition compartment. The movement of the mercury from one compartment to the other cannot, however, except it be unusually violent, result in contact of the mercury with the iron discharge member which is disposed well above the normal mercury level and is afforded some measure of protection by the graphite plates. It will also be apparent that the mercury or amalgam does not suffer a substantial change of direction as it comes in contact with the plates of the cathode, so that a minimum of turbulence is imparted to it. The "streamlining" effect thus obtained prevents, in large measure, droplets of mercury from leaving the main layer and passing upward in the direction of the iron discharge member, and even if these should be projected upward to a slight extent, there is ample opportunity for them to impinge on the graphite plates and thus be stopped from coming into contact with the discharge members. These factors probably account for the fact that the discharge member does not become coated with mercury and retains its low discharge potential for hydrogen even after long periods of use. In any event, the fact remains that in decomposition compartments provided with such graphite grids and overlying discharge members made of a metal having a lower discharge potential for hydrogen than does graphite, the discharge member remains uncontaminated with mercury and the efficiency of the cell is substantially improved over that of heretofore customary types.

Although plate dimensions and plate spacings are not particularly critical, we have found that best results, from the standpoint of avoiding contamination of the discharge member, are obtained when the height of the plates is several times the distance between plates. Thus, good results are obtained with plates 1¼ inches in height spaced from each other by ¼ inch. Naturally, the more rapid the rate of amalgam flow, the greater should be the height of the graphite plates, but with the usual flow rates the distance between the normal amalgam level and the lowermost point on the discharge member need not exceed 1 inch.

The discharge member is conveniently made of iron but may be of any metal which offers a lower discharge potential with respect to hydrogen than does graphite. Thus, commercial considerations aside, it might even be made of platinum, which affords an exceedingly low discharge potential for hydrogen.

The magnitude of the advantages afforded by our invention is well illustrated by a comparison of the results obtained in a cell of the type illustrated in Fig. 1, with and without the iron discharge member. In the first case, the graphite cathode was employed without the overlying discharge member, and a solution containing 50% by weight NaOH was produced in the cathode compartment at various cell temperatures. At 60° C. the amalgam contained 0.1% by weight of sodium and at 75° C. the sodium content of the amalgam was reduced to 0.03% by weight, with a resultant increase in current efficiency at the higher temperature.

In the second case, the conditions were the same except that the iron discharge member was placed on the cathode, and a marked improvement in operation resulted, in that at 61° C. the amalgam contained only 0.03% of sodium, which low concentration and resultant improvement in current efficiency was not obtained in the first case at temperatures less than 75° C. The latter temperature could not be maintained in the cell without supplying heat from an extraneous source.

To summarize, at a given temperature the use of the discharge member in accordance with our invention results in a lower alkali metal content in the amalgam and consequent higher current efficiency and power savings. From the standpoint of thermal input, the invention permits the attainment of the same current efficiency as in heretofore operations at a lower cell temperature.

We claim:

1. In an electrolytic cell in which a moving body of an amalgam of mercury and an alkali metal is reacted with an aqueous body overlying the amalgam to produce hydrogen and hydroxide of the alkali metal, the combination which comprises a cathode in the form of a series of upwardly projecting plates of graphite in contact with amalgam and separated from each other by substantial but narrow spaces, said plates projecting upwardly into the aqueous body for a substantial distance and to a level above any attained by the amalgam during its normal movement and being several times as high as the spaces are wide and disposed with their major surfaces in the direction of movement of the amalgam and a massive metallic grid member resting on and in good electrical contact with said plates, said member being composed of a metal having a lower overvoltage with respect to hydrogen than does the graphite and that is resistant to the action of the aqueous body but tends to amalgamate with mercury and become coated thereby and being disposed in contact with the aqueous body but spaced a substantial distance from the amalgam and entirely above any level attained by the amalgam during its normal movement.

2. In an electrolytic cell in which a moving body of an amalgam of mercury and an alkali metal is reacted with an aqueous body overlying the amalgam to produce hydrogen and hydroxide of the alkali metal, the combination which comprises a cathode in the form of a series of upwardly projecting plates of graphite in contact with amalgam and separated from each other by substantial spaces, said plates projecting upwardly into the aqueous body for a substantial distance and to a level above any attained by the amalgam during its normal movement and being several times as high as the spaces are wide and disposed with their major surfaces in the direction of movement of the amalgam, a massive metallic grid member resting on and in good electrical contact with said plates, said member being composed of a metal having a lower overvoltage with respect to hydrogen than does the graphite and that is resistant to the action of the aqueous body but tends to amalgamate with the mercury and become coated thereby and being disposed in contact with the aqueous body but spaced a substantial distance from the amalgam and entirely above any level attained by the amalgam during its normal movement, and a downwardly projecting auxiliary metal contact member directly connecting the metallic member with the amalgam and passing through and in contact with the aqueous body.

WILLIAM C. GARDINER.
JOSEPH LEONARD WOOD.